(12) United States Patent
Hirata et al.

(10) Patent No.: US 9,880,888 B2
(45) Date of Patent: Jan. 30, 2018

(54) EXECUTING AN OPERATING SYSTEM IN A MULTIPROCESSOR COMPUTER SYSTEM

(71) Applicant: MITSUBISHI ELECTRIC CORPORATION, Tokyo (JP)

(72) Inventors: Akira Hirata, Tokyo (JP); Masahiro Abukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/782,819

(22) PCT Filed: Jun. 7, 2013

(86) PCT No.: PCT/JP2013/065884
§ 371 (c)(1),
(2) Date: Oct. 7, 2015

(87) PCT Pub. No.: WO2014/196083
PCT Pub. Date: Dec. 11, 2014

(65) Prior Publication Data
US 2016/0041850 A1    Feb. 11, 2016

(51) Int. Cl.
*G06F 9/52* (2006.01)
*G06F 9/46* (2006.01)
*G06F 11/20* (2006.01)
*G06F 9/48* (2006.01)
*G06F 9/44* (2006.01)

(52) U.S. Cl.
CPC ............ *G06F 9/52* (2013.01); *G06F 9/441* (2013.01); *G06F 9/46* (2013.01); *G06F 9/4843* (2013.01); *G06F 11/20* (2013.01)

(58) Field of Classification Search
CPC ........................................................ G06F 9/52
See application file for complete search history.

(56) References Cited

U.S. PATENT DOCUMENTS

| | | | |
|---|---|---|---|
| 2005/0172164 A1* | 8/2005 | Fox | G06F 11/2023 714/13 |
| 2007/0022421 A1* | 1/2007 | Lescouet | G06F 9/4843 718/1 |
| 2008/0091974 A1 | 4/2008 | Nakashima | |
| 2008/0141065 A1 | 6/2008 | Okabe | |

(Continued)

FOREIGN PATENT DOCUMENTS

| | | |
|---|---|---|
| JP | 8-272755 A | 10/1996 |
| JP | 2006-172100 A | 6/2006 |

(Continued)

*Primary Examiner* — Charlie Sun
(74) *Attorney, Agent, or Firm* — Birch, Stewart, Kolasch & Birch, LLP

(57) ABSTRACT

When a CPU core (1) 101 and a CPU core (2) 102 share the execution of an OS (1) 201, a program (A) 204, and a program (B) 205, the CPU core (2) 102 withdraws from sharing the execution of the OS (1) 201, the program (A) 204, and the program (B) 205, starts a replacement OS which replaces the OS (1) 201, and switches an OS on which the program (A) 204 operates from the OS (1) 201 to the replacement OS. After the OS on which the program (A) 204 operates is switched to the replacement OS, the CPU core (1) 101 terminates the execution of the OS (1).

5 Claims, 9 Drawing Sheets

(56) References Cited

U.S. PATENT DOCUMENTS

| | | | |
|---|---|---|---|
| 2008/0155542 A1* | 6/2008 | Maigne | G06F 9/4555 |
| | | | 718/100 |
| 2009/0240980 A1 | 9/2009 | Inoue et al. | |
| 2010/0005275 A1* | 1/2010 | Kamigata | G06F 9/46 |
| | | | 712/203 |
| 2013/0007729 A1* | 1/2013 | Sirotkin | G06F 9/4445 |
| | | | 718/1 |

FOREIGN PATENT DOCUMENTS

| | | |
|---|---|---|
| JP | 2008/77388 A | 4/2008 |
| JP | 2008-510238 A | 4/2008 |
| JP | 2008-123357 A | 5/2008 |
| JP | 2008-123439 A | 5/2008 |
| JP | 2009-205696 A | 9/2009 |
| JP | 2010-20621 A | 1/2010 |
| JP | 2012-99000 A | 5/2012 |
| WO | WO 2008/044423 A1 | 4/2008 |

* cited by examiner

EXECUTING AN OPERATING SYSTEM IN A MULTIPROCESSOR COMPUTER SYSTEM

TECHNICAL FIELD

The present invention relates to a technique for executing an OS (Operating System) using a plurality of CPUs (Central Processing Units).

BACKGROUND ART

For example, in Patent Literature 1, a plurality of OSs (domains) are operated using multiple cores for stable operation of a computer system.

In Patent Literature 1, when a malfunction occurs in one domain, processing of the domain where the malfunction has occurred is undertaken by another domain, the domain where the malfunction has occurred is restarted, and processing of the restarted domain is restored.

Patent Literature 2 discloses a method which allows processing of one domain to be undertaken by another domain promptly with low overhead by using a shared memory.

Citation List

Patent Literature

Patent Literature 1: JP 2010-020621 A
Patent Literature 2: JP 2012-099000 A

SUMMARY OF INVENTION

Technical Problem

For stable operation of a computer system, it is conceived that a plurality of OSs are operated regularly on multiple cores by an asymmetric multiprocessor (AMP), as in Patent Literature 1 and Patent Literature 2 described above.

However, there is a problem that when a plurality of OSs are operated regularly in parallel on multiple cores by an AMP, each OS consumes memory, which is inefficient and leads to a reduced throughput.

On the other hand, in a symmetric multiprocessor (SMP) that distributes processing among a plurality of CPU cores, an improved throughput can be achieved as the number of CPU cores that can be used increases.

The present invention has been made in view of these circumstances, and mainly aims to make a computer system operate stably while achieving an improved throughput by an SMP.

Solution to Problem

A computer system according to the present invention includes a plurality of CPUs (Central Processing Units), wherein when the plurality of CPUs share execution of an OS (Operating System) and a program operating on the OS, a specific CPU of the plurality of CPUs withdraws from sharing the execution of the OS and the program, starts a replacement OS which replaces the OS, and switches an OS on which the program operates from the OS to the replacement OS; and after the OS on which the program operates is switched to the replacement OS, another CPU which is a CPU other than the specific CPU terminates the execution of the OS.

Advantageous Effects of Invention

According to the present invention, a plurality of CPUs share the execution of an OS and a program operating on the OS by an SMP, so that an improved throughput can be achieved.

Further, when a failure related to the OS occurs, for example, a specific CPU withdraws from sharing the execution of the OS and the program, starts a replacement OS, and switches the OS on which the program operates to the replacement OS.

Therefore, even when a failure related to the OS occurs, the program can be executed continuously with the replacement OS.

DESCRIPTION OF EMBODIMENTS

First Embodiment

In this embodiment, the description will be directed to a computer system that operates by a symmetric multiprocessor (SMP) at a normal time, and upon occurrence of a failure, temporarily operates by an asymmetric multiprocessor (AMP) to switch an OS, and returns to the SMP after the OS is switched.

Figure 1:
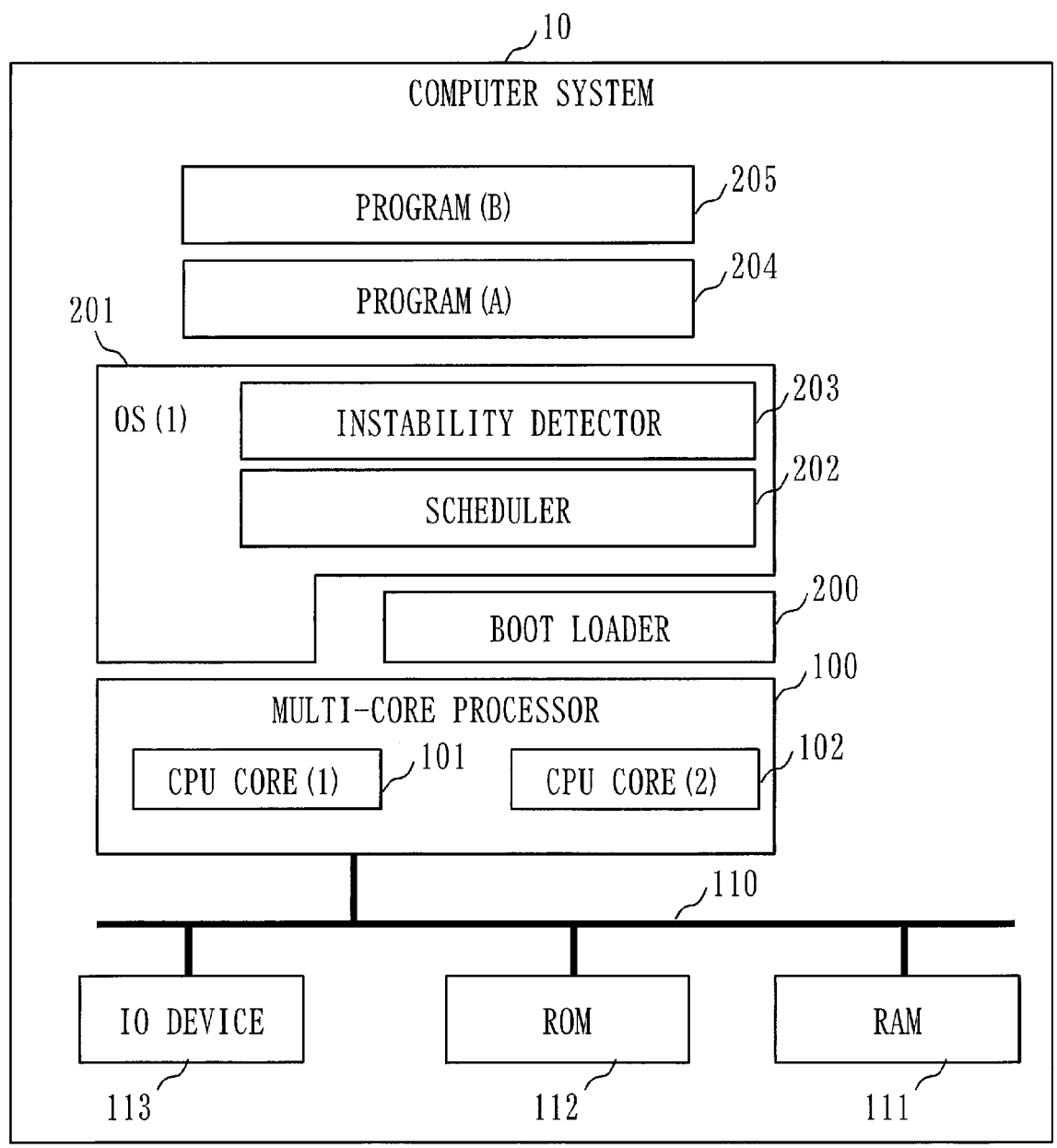
FIG. 1 is a diagram illustrating an example of the configuration of a computer system according to a first embodiment.

FIG. 1 illustrates an example of the configuration of a computer system 10 according to this embodiment.

The computer system 10 has a multi-core processor 100, a bus 110, a RAM 111, a ROM 112, and an IO device 113 as hardware.

The multi-core processor 100 has a CPU core (1) 101 and a CPU core (2) 102.

The bus 110 connects the multi-core processor 100, the RAM 111, the ROM 112, and the IO device 113.

The RAM 111 is a volatile memory which is connected to the bus 110.

The ROM 112 is a non-volatile memory which is connected to the bus 110.

The IO device 113 is connected to the bus 110, and is accessed by an OS (1) 201 and an OS (2) 211 to be described later.

The computer system 10 has a boot loader 200, the OS (1) 201, a program (A) 204, and a program (B) 205 as software.

The OS (1) 201 has a scheduler 202 and an instability detector 203.

At startup of the multi-core processor 100, the boot loader 200 is read from the ROM 112 by the CPU core (1) 101 or the CPU core (2) 102, performs an initialization process of the hardware, loads via the bus 110 an OS execution image 302 to be described later which is in the ROM 112 into the RAM 111, and executes the OS execution image 302.

The OS (1) 201 is an operating system that operates on the multi-core processor 100.

The program (A) 204 and the program (B) 205 are application programs that operate on the OS (1) 201.

The scheduler 202 has a function to allocate a program that operates on the OS (1) 201 to the CPU core (1) 101 or the CPU core (2) 102 and causes the CPU core (1) 101 or the CPU core (2) to execute the program.

The instability detector 203 has a function to notify a malfunction to the OS (1) 201 when a program operating on the OS (1) 201 causes a memory leak or an access to an address outside a specified range.

Figure 6:
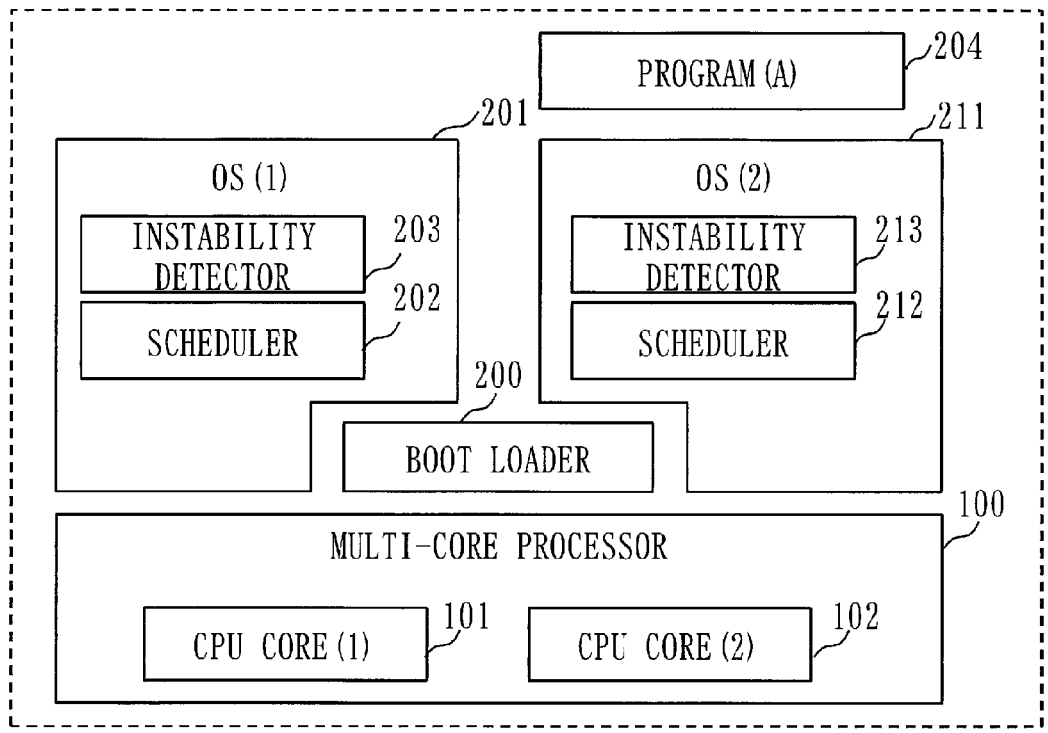
FIG. 6 is a diagram illustrating an example of the operation of the computer system according to the first embodiment.

In FIG. 1, only the OS (1) 201 is illustrated. However, the computer system 10 also includes the OS (2) 211, as illustrated in FIG. 6.

The OS (2) 211 operates separately from the OS (1) 201 in the multi-core processor 100.

The OS (2) 211 has an internal configuration which is substantially the same as that of the OS (1) 201, and includes a scheduler 212 and an instability detector 213.

The scheduler 212 is substantially the same as the scheduler 202, and the instability detector 213 is substantially the same as the instability detector 203.

The multi-core processor 100 constitutes an SMP that operates using the CPU core (1) 101 and the CPU core (2) 102.

The CPU core (1) 101 and the CPU core (2) 102 each have an inter-CPU interrupt feature for generating an interrupt signal between each other.

Each of the OS (1) 201 and the OS (2) 211 operates as an OS for the SMP in the multi-core processor 100.

Instead of the SMP, the CPU core (1) 101 may execute the OS (1) 201 independently, and the CPU core (2) 102 may execute the OS (1) 201 independently.

Similarly, the CPU core (1) 101 may execute the OS (2) 211 independently, and the CPU core (2) 102 may execute the OS (2) 211 independently.

In this embodiment, when a failure related to the OS (1) 201 occurs while the CPU core (1) 101 and the CPU core (2) 102 are executing the OS (1) 201 by the SMP, the CPU core (2) 102 is separated.

That is, the CPU core (2) 102 withdraws from sharing the execution of the OS (1) 201, and the CPU core (2) 102 is re-activated and the re-activated CPU core (2) 102 starts the OS (2) 211.

In this embodiment, the OS (2) 211 is an OS which replaces the OS (1) 201 and corresponds to an example of a replacement OS.

Then, after the CPU core (2) 102 has started the OS (2) 211, the CPU core (1) 101 terminates the execution of the OS (1) 201 and the CPU core (1) 101 is re-activated.

After the CPU core (1) 101 is re-activated, the CPU core (1) 101 and the CPU core (2) 102 execute the OS (2) 211 by the SMP.

Re-activating the CPU core (2) 102 means to start the boot loader 200, initialize data in an area in the RAM 111 which is secured for the CPU core (2) 102, and initialize data in registers in the CPU core (2) 102.

Similarly, re-activating the CPU core (1) 101 means to start the boot loader 200, initialize data in an area in the RAM 111 which is secured for the CPU core (1) 101, and initialize data in registers in the CPU core (1) 101.

Figure 2:
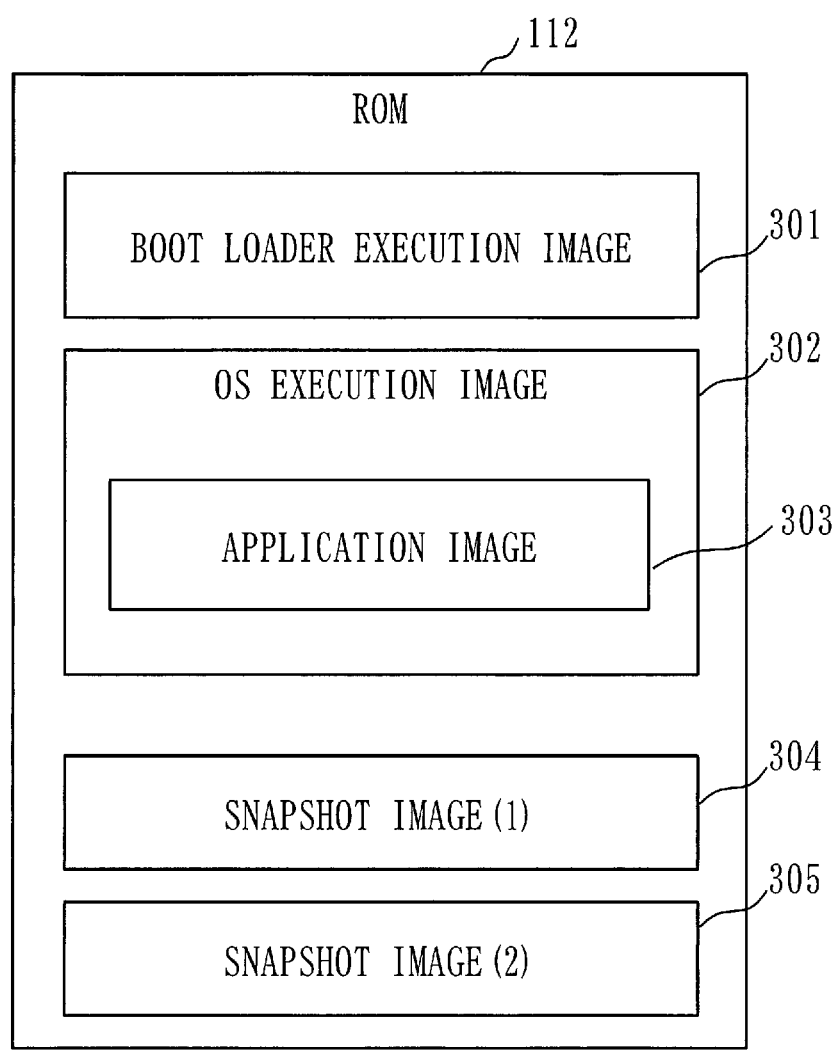
FIG. 2 is a diagram illustrating an example of data to be saved in a ROM according to the first embodiment.

FIG. 2 illustrates an example of data to be saved in the ROM 112.

In FIG. 2, a boot loader execution image 301 is an execution image of the boot loader 200.

The OS execution image 302 is an execution image of an OS.

In FIG. 1 and FIG. 6, a state in which the OS execution image 302 is being executed by the multi-core processor 100 is represented as the OS (1) 201 or the OS (2) 211.

An application image 303 indicates an execution image of an application program.

In FIG. 1 and FIG. 6, a state in which the application image 303 is being executed by the multi-core processor 100 is represented as the program (A) 204 and the program (B) 205.

A snapshot image (1) 304 is a snapshot image in which the content of a work memory at a time when the initialization of the OS (1) 201 and a device driver is completed in the OS (1) 201 is saved as data.

A snapshot image (2) 305 is a snapshot image in which the content of a work memory at a time when the initialization of the OS (2) 211 and a device driver is completed in the OS (2) 211 is saved as data.

Figure 3:
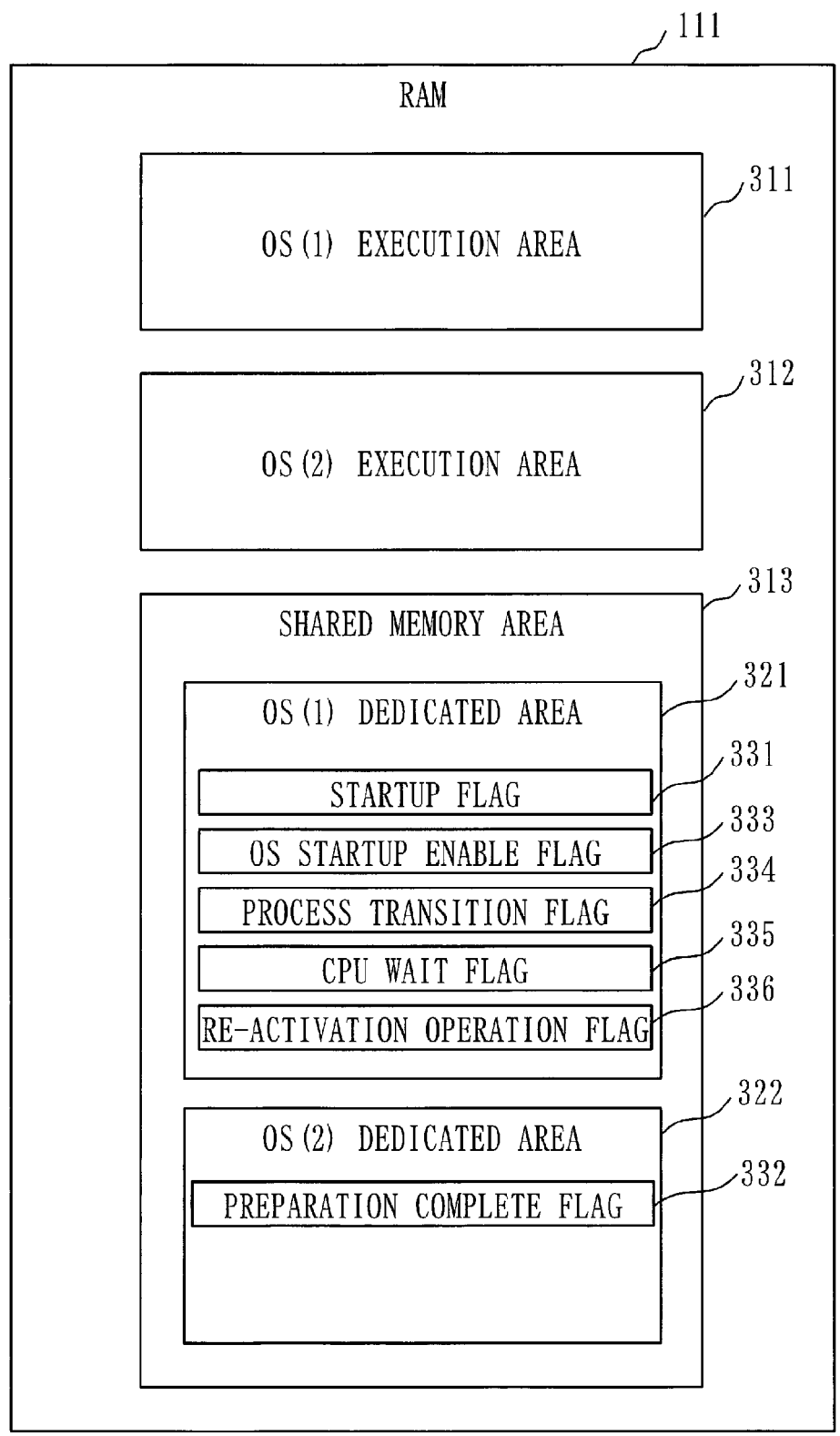
FIG. 3 is a diagram illustrating an example of data to be saved in a RAM according to the first embodiment.

FIG. 3 illustrates data to be saved in the RAM 111.

An OS (1) execution area 311 is a physical memory area into which the OS execution image 302 is loaded when the OS (1) 201 is executed by the multi-core processor 100.

An OS (2) execution area 312 is a physical memory area into which the OS execution image 302 is loaded when the OS (2) 211 is executed by the multi-core processor 100.

A shared memory area 313 is a physical memory area which is accessed by the CPU core (1) 101 and the CPU core (2) 102 when the OS (1) 201 and the OS (2) 211 operate at the same time.

An OS (1) dedicated area 321 is a physical memory area which can be written to only by the OS (1) 201 (i.e., only by the CPU core executing the OS (1) 201).

An OS (2) dedicated area 322 is a physical memory area which can be written to only by the OS (2) 211 (i.e., only by the CPU core executing the OS (2) 211).

A startup flag 331 is a flag by which a startup mode of the OS (2) 211 is notified.

The startup flag 331 indicates a startup mode to execute the OS (2) 211 by the SMP (regular startup mode) or a startup mode to execute the OS (2) 211 only by the CPU core (2) 102 (separate OS startup mode).

An OS startup enable flag 333 is a flag to notify whether or not access to the IO device 113 by the OS (2) 211 (hereinafter, access to the IO device 113 will also be referred to as JO access) is allowed.

A process transition flag 334 is a flag to notify that the context information of a process being processed by the OS (1) 201 has been saved.

A CPU wait flag 335 is a flag to notify that the CPU core (1) 101 has been initialized due to the re-activation of the CPU core (1) 101 and the CPU core (1) 101 is in a standby state (idle).

A re-activation operation flag 336 is a flag to instruct the CPU core (1) 101 to start an OS or wait in the standby state (idle) at re-activation.

A preparation complete flag 332 is a flag to notify that the CPU core (2) 102 has completed the startup of the OS (2) 211 not involving JO access.

A notification between the CPU cores is performed via the shared memory area 313.

The OS (1) dedicated area 321 is used for a notification from the OS (1) 201 to the OS (2) 211 and a notification from the CPU core (1) 101 to the CPU core (2) 102. The OS (2) dedicated area 322 is used for a notification from the OS (2) 211 to the OS (1) 201 and a notification from the CPU core (2) 102 to the CPU core (1) 101.

With reference to FIG. 4 through FIG. 7, an example of the operation of the computer system 10 according to this embodiment will now be described.

Figure 4:
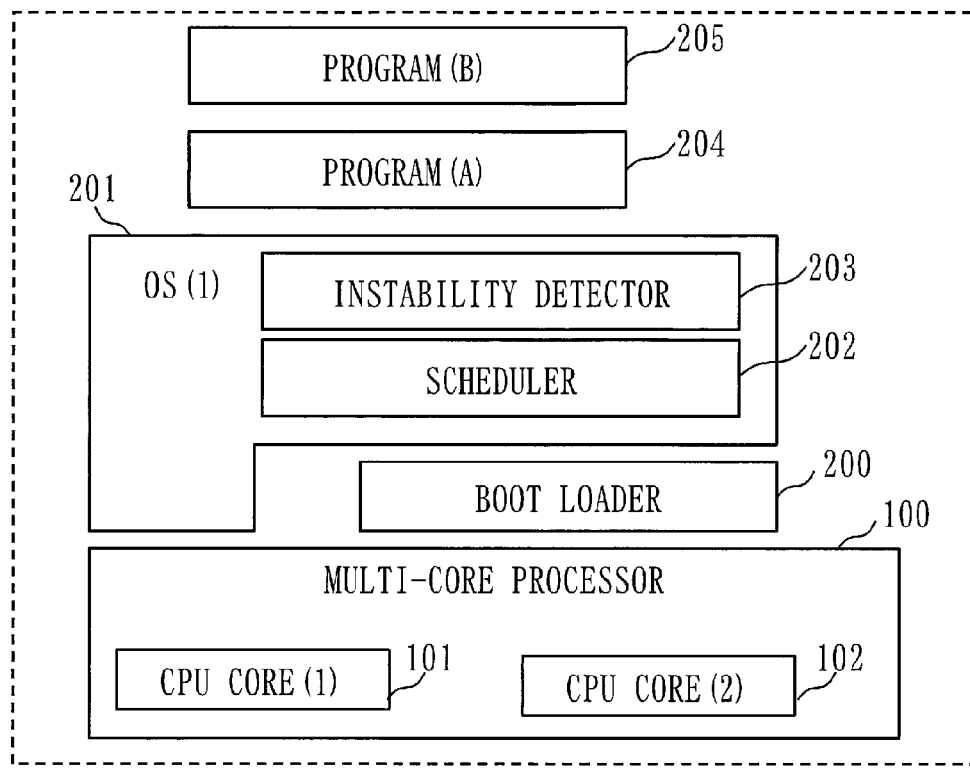
FIG. 4 is a diagram illustrating an example of the operation of the computer system according to the first embodiment.

FIG. 4 represents a state in which the CPU core (1) 101 and the CPU core (2) 102 share the execution of the OS (1) 201 by the SMP, and the program (A) 204 and the program (B) 205 are operating on the OS (1) 201.

At this time, the operation of the program (B) 205 becomes unstable and the instability detector 203 detects that the unstable operation of the program (B) 205 may affect the entire system. Then, the CPU core (1) 101 executes the scheduler 202 and stops allocating processing to the CPU core (2) 102 in order to separate the CPU core (2) 102 from the OS (1) 201.

The CPU core (2) 102 to which processing is no longer allocated enters a standby idle state after finishing processing which has been allocated.

That is, the CPU core (2) 102 withdraws from sharing the execution of the OS (1) 201 and the program (A) 204.

Figure 5:
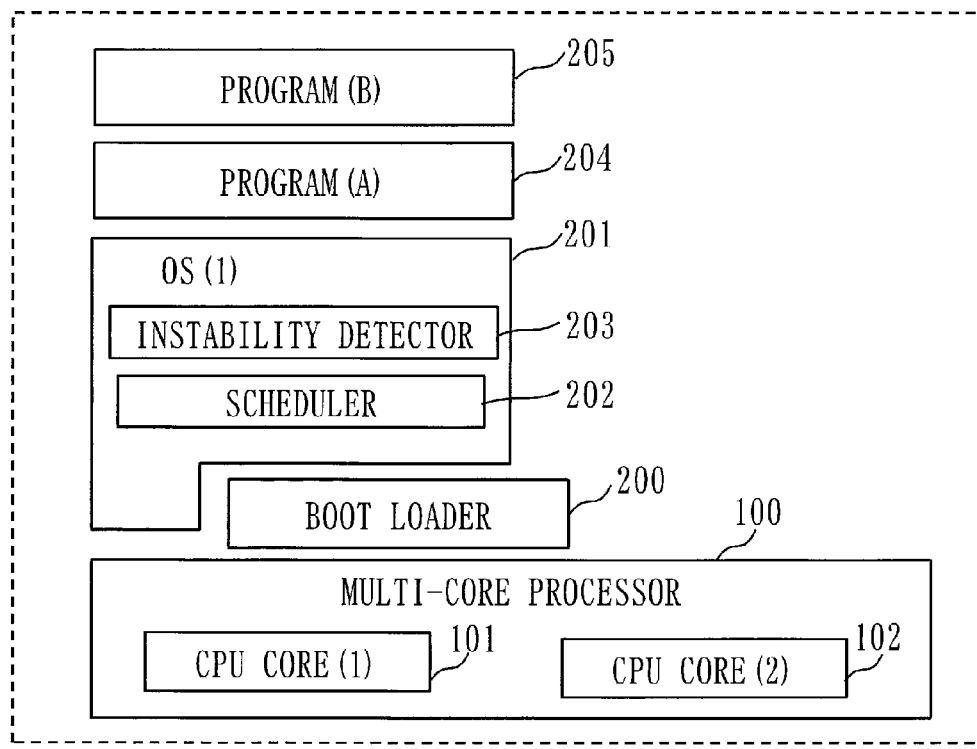
FIG. 5 is a diagram illustrating an example of the operation of the computer system according to the first embodiment.

As a result, only the CPU core (1) 101 executes the OS (1) 201. Consequently, only the CPU core (1) 101 executes the program (A) 204 and the program (B) 205 operating on the OS (1) 201 (FIG. 5).

Then, the CPU core (1) 101 notifies the CPU core (2) 102 to start the OS (2) 211.

This notification is performed by the CPU core (1) 101 by setting a value indicating the "separate OS startup mode" in the startup flag 331 (FIG. 3).

The CPU core (1) 101 also requests the re-activation of the CPU core (2) 102.

This request is made with an inter-CPU interrupt from the CPU core (1) 101 to the CPU core (2) 102 or by resetting the CPU core (2) 102 through a register operation by the CPU core (1) 101.

Upon being requested the re-activation by the CPU core (1) 101, the CPU core (2) 102 is re-activated.

The CPU core (2) 102 starts the boot loader 200, performs an initialization process, reads the OS execution image 302 (FIG. 2) from the ROM 112, and starts the OS (2) 211 (FIG. 6).

At this time, the CPU core (2) 102 performs an OS initialization process not involving access to the IO device 113 (corresponding to a first initialization process) so as not to interfere with the operation of the OS (1) 201 being executed by the CPU core (1) 101.

For this OS initialization process, a startup method may be employed in which the snapshot image (2) 305 which is saved in the ROM 112 in advance is loaded into the RAM 111 to shorten the initialization of the OS and the device driver.

After the OS initialization process not involving access to the JO device 113 is completed for the OS (2) 211, the CPU core (2) 102 reads the value of the startup flag 331 and detects that the value indicating the "separate OS startup mode" is set.

Then, the CPU core (2) 102 notifies the CPU core (1) 101 that the OS (2) 211 is ready to operate.

This notification is performed by setting a predetermined value in the preparation complete flag 332.

Then, the CPU core (1) 101 performs processing to terminate the program (B) 205 whose operation has become unstable.

The CPU core (1) 101 also stores the context information of the program (A) 204 in the OS (1) dedicated area 321 so as to switch the executor of the program (A) 204 to the OS (2) 211.

The CPU core (1) 101 also sets in the process transition flag 334 a value indicating that the context information has been stored.

Further, the CPU core (1) 101 notifies the CPU core (2) 102 that the JO device 113 can be accessed from the OS (2) 211.

This notification is performed by setting a predetermined value in the OS startup enable flag 333.

The CPU core (2) 102 reads the value of the OS startup enable flag 333, detects that access to the JO device 113 by the OS (2) 211 is allowed, and performs an OS initialization process involving access to the JO device 113 (corresponding to a second initialization process).

Based on the value of the process transition flag 334, the CPU core (2) 102 also reads the context information of the program (A) 204 to make the program (A) 204 resume operating on the OS (2) 211.

The CPU core (2) 102 also newly executes the program (B) 205 on the OS (2) 211.

Then, the CPU core (1) 101 stops executing the OS (1) 201 and is re-activated.

The CPU core (1) 101 executes the boot loader 200. After the initialization process of the CPU core (1) 101 is completed, the CPU core 101 sets in the CPU wait flag 335 a value indicating that the CPU core (1) 101 is in the idle state.

Using an inter-CPU interrupt, the CPU core (1) 101 also notifies the CPU core (2) 102 that the value has been set in the CPU wait flag 335, and the CPU core (1) 101 waits in the idle state.

After the operation of the program (A) 204 is resumed, the CPU core (2) 102 reads the CPU wait flag 335 and detects that the CPU core (1) 101 is in the idle state. Then, the scheduler 212 of the OS (2) 211 starts to allocate processing to the CPU core (1) 101.

Figure 7:
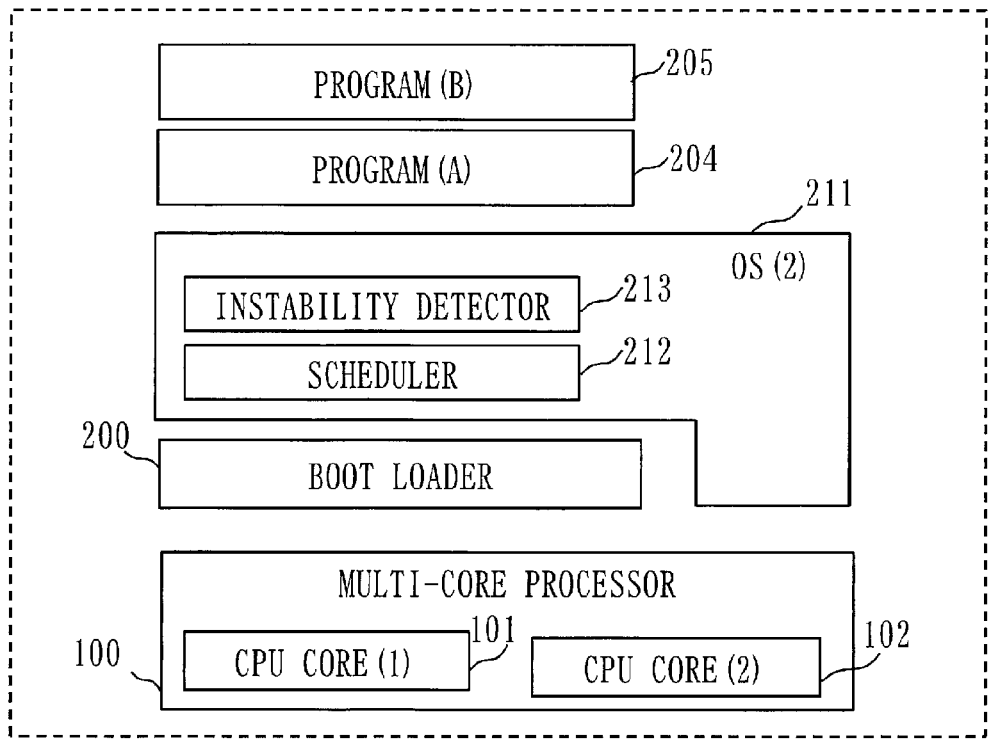
FIG. 7 is a diagram illustrating an example of the operation of the computer system according to the first embodiment.

As a result, the OS (2) 211 is executed by the CPU core (1) 101 and the CPU core (2) 102 as the OS for the SMP (FIG. 7).

Figure 8:
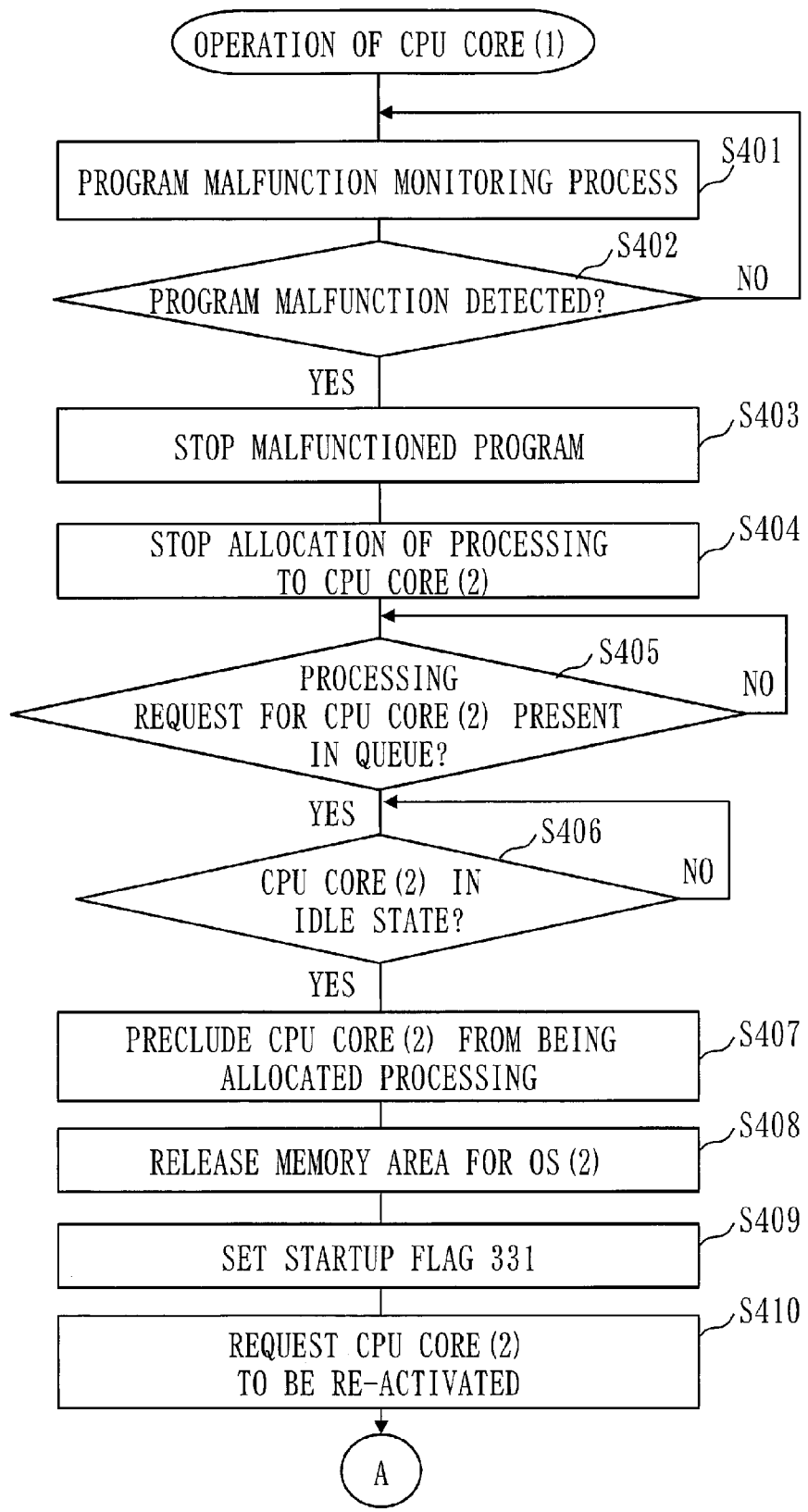
FIG. 8 is a flowchart illustrating an example of the operation of a CPU core (1) according to the first embodiment.
Figure 9:
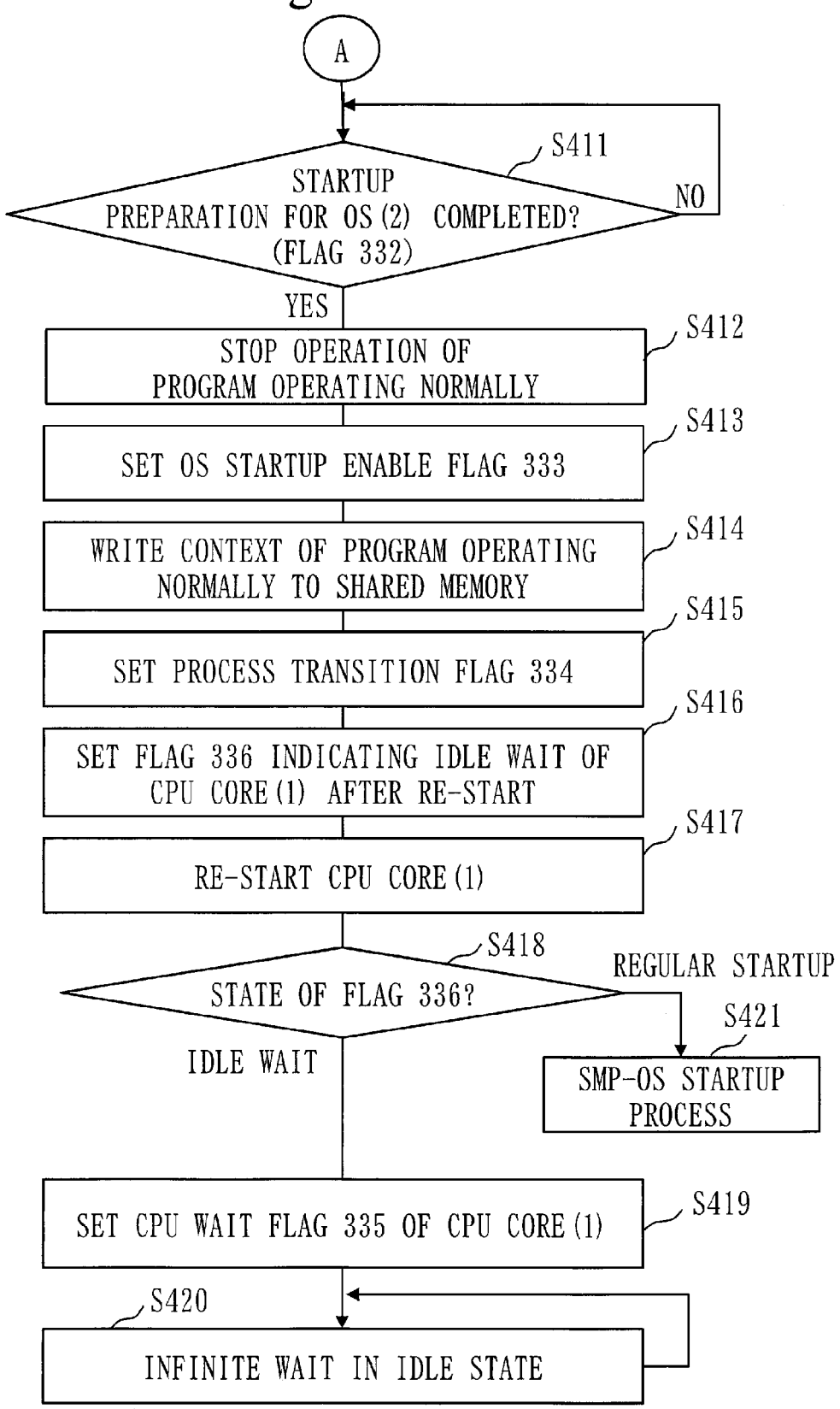
FIG. 9 is a flowchart illustrating an example of the operation of the CPU core (1) according to the first embodiment.

With reference to FIG. 8 and FIG. 9, an example of the operation of the CPU core (1) 101 will now be described.

In the state of FIG. 4, the CPU core (1) 101 executes the instability detector 203 and monitors the operation of a program operating on the OS (1) 201 (S401).

For example, when the CPU core (1) 101 determines that the operation of the program (B) 205 is unstable (YES in S402), the CPU core (1) 101 executes the scheduler 202 and stops the execution of the program (B) 205 with the unstable operation, by processing such as removing the program (B) 205 with the unstable operation from a queue of the scheduler 202 (S403).

Then, the CPU core (1) 101 executes the scheduler 202 to stop allocating a program to the CPU core (2) 102 (S404).

Further, the CPU core (1) 101 executes the scheduler 202 to check that processing which has already been allocated to the CPU core (2) 102 is finished (S405), and check that the CPU core (2) 102 is in the idle state (S406).

After the CPU core (2) 102 has entered the idle state, the CPU core (1) 101 executes the scheduler 202 to preclude the CPU core (2) 102 from being allocated processing (S407).

Then, the CPU core (1) 101 operates an MMU (Memory Management Unit) or the like to release the area in the RAM 111 managed by the OS (1) 201 for the OS (2) 211 (S408).

Then, the CPU core (1) 101 sets the value indicating the "separate OS startup mode" in the startup flag 331 (FIG. 3) (S409).

Then, the CPU core (1) 101 requests the re-activation of the CPU core (2) 102 with an inter-CPU interrupt to the CPU core (2) 102 or a reset (S410).

The CPU core (1) 101 waits for completion of the startup preparation for the OS (2) 211 (completion of the first initialization process) in the CPU core (2) 102, monitoring the preparation complete flag 332 (FIG. 3) (S411).

Then, when the CPU core (1) 101 detects that the startup preparation for the OS (2) 211 is completed (YES in S411), the CPU core (1) 101 executes the scheduler 202 and stops the operation of the program (A) 204 which is operating normally (S412).

The CPU core (1) 101 also implements control to prevent IO access to the IO device 113 from the OS (1) 201, and sets in the OS startup enable flag 333 (FIG. 3) a value to notify that IO access by the OS (2) 211 is allowed (S413).

This enables the CPU core (2) 102 to execute the OS initialization process of the OS (2) 211 involving IO access.

The CPU core (1) 101 also writes the context information of the program (A) 204 which has been operating normally on the OS (1) 201 to the OS (1) dedicated area 321 (S414).

Further, the CPU core (1) 101 sets in the process transition flag 334 a value to notify that use of the context information written in S414 is allowed (S415).

Then, the CPU core (1) 101 sets in the re-activation operation flag 336 (FIG. 3) a value indicating the "idle wait mode" so as to wait in the idle state after being re-activated (S416).

Then, the CPU core (1) 101 stops executing the OS (1) 201 and is re-activated (S417).

After being re-activated, the CPU core (1) 101 reads the value of the re-activation operation flag 336 (S418). The value of the re-activation operation flag 336 indicates the "idle wait mode". Thus, the CPU core (1) 101 sets in the CPU wait flag 335 (FIG. 3) a value to notify that the CPU core (1) 101 is in the standby state (idle) (S419).

Then, the CPU core (1) 101 enters an infinite wait in the idle state (S420).

On the other hand, if the value of the re-activation operation flag 336 indicates the "regular startup mode" in S418, the OS (1) 201 is started regularly as the OS for the SMP (S421).

Figure 10:
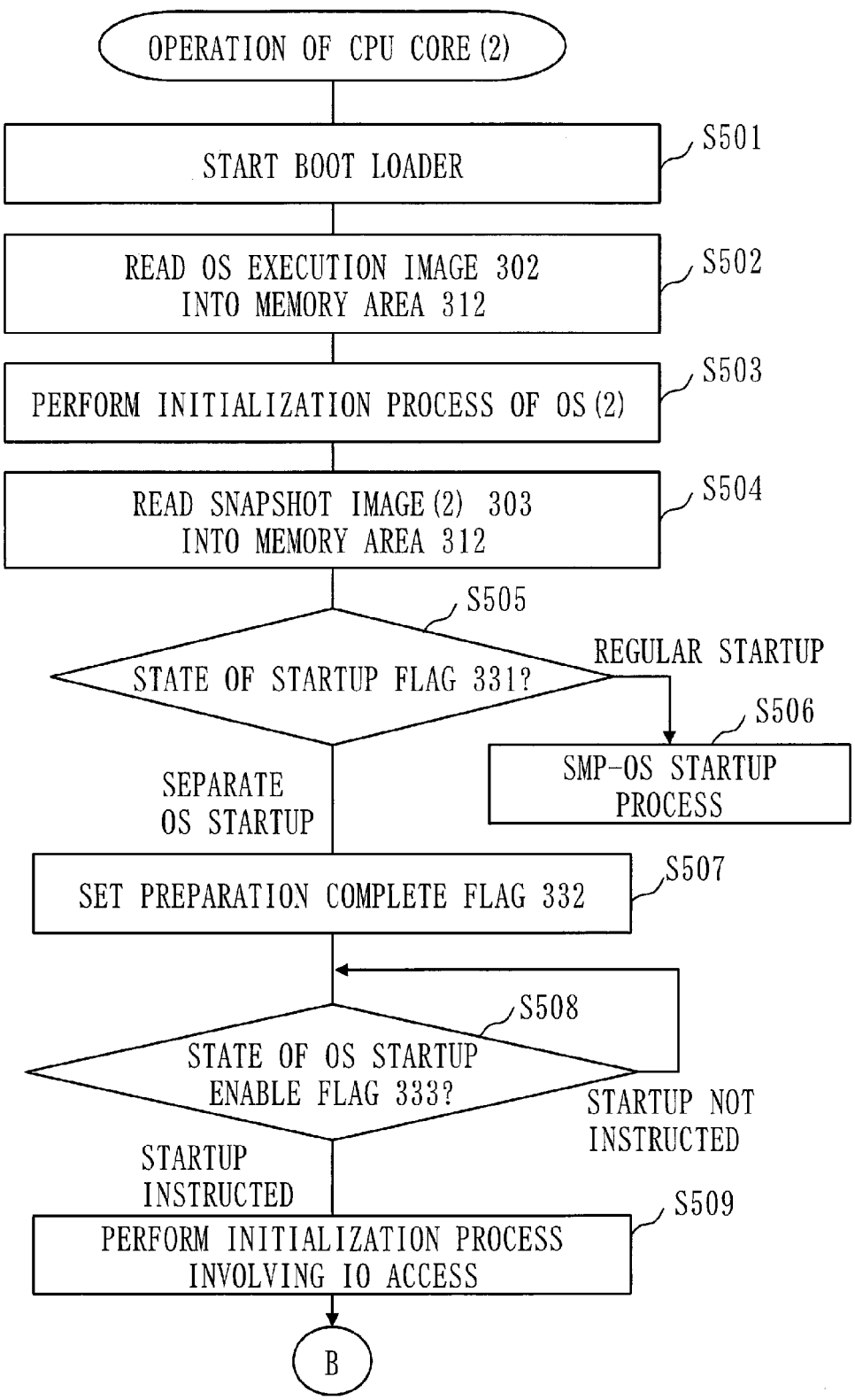
FIG. 10 is a flowchart illustrating an example of the operation of a CPU core (2) according to the first embodiment.
Figure 11:
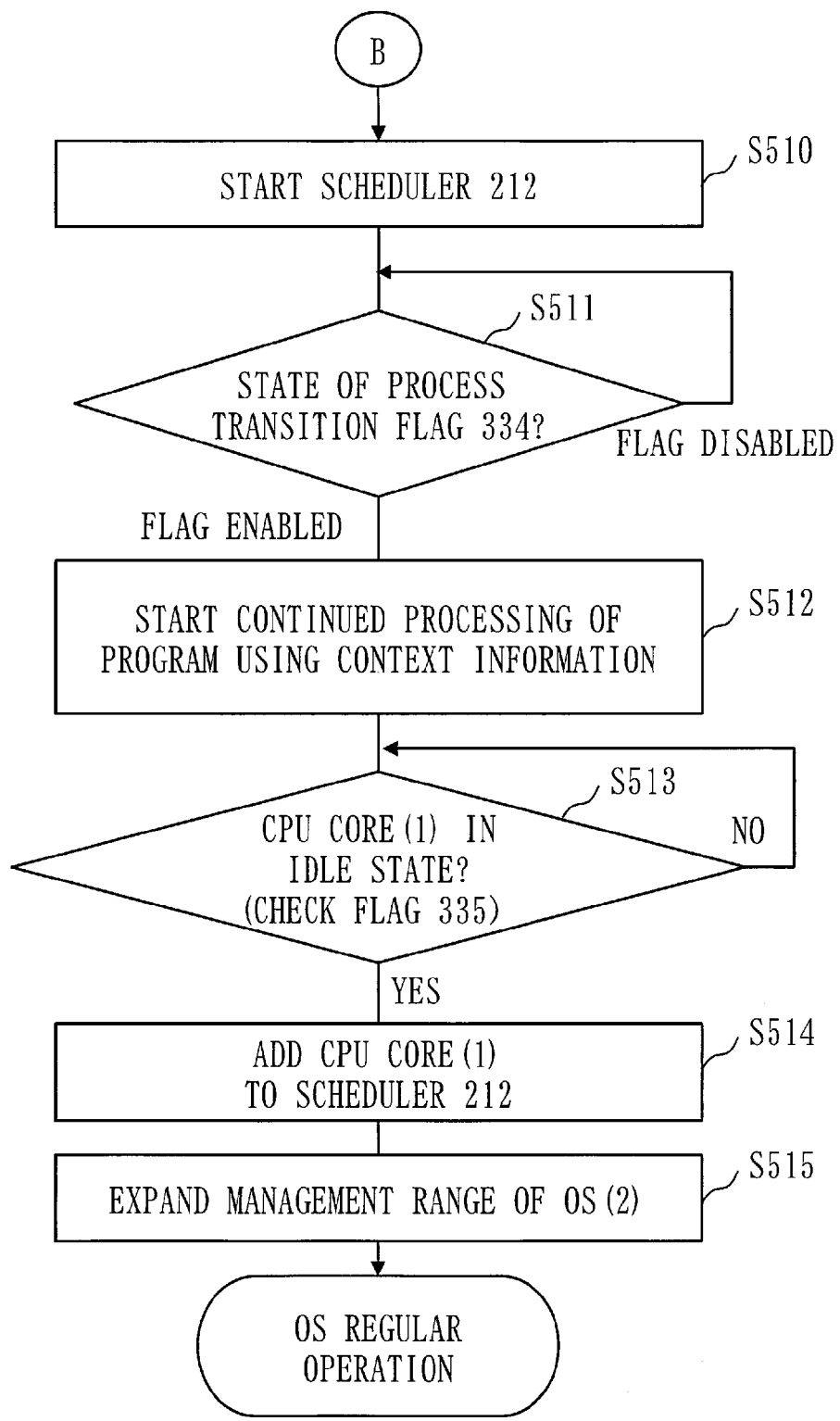
FIG. 11 is a flowchart illustrating an example of the operation of the CPU core (2) according to the first embodiment.

With reference to FIG. 10 and FIG. 11, an example of the operation of the CPU core (2) 102 will now be described.

Based on the request for re-activation which is made in S410 of FIG. 8, the CPU core (2) 102 starts the boot loader 200 (S501).

The CPU core (2) 102 also performs a predetermined initialization process.

Then, the CPU core (2) 102 loads the OS execution image 302 in the ROM 112 into the OS (2) execution area 312 of the RAM 111 (S502).

Then, the CPU core (2) 102 starts the initialization process of the OS (2) 211 (S503).

In S503, the CPU core (2) 102 performs initialization not involving IO access.

Then, the CPU core (2) 102 restores an initialized state of the system using the snapshot image (2) 305 in the ROM 112 (S504).

Then, the CPU core (2) 102 checks the value of the startup flag 331 (S505). If the value of the startup flag 331 is the value indicating the "regular startup mode", the CPU core (2) starts the OS (2) 211 regularly as the OS for the SMP (S506).

On the other hand, if the value of the startup flag 331 is the value indicating the "separate OS startup mode", the CPU core (2) 102 sets in the preparation complete flag 332 a value to notify that the startup of the OS (2) 211 not involving JO access is completed (S507).

The CPU core (2) 102 also waits for the OS startup enable flag 333 (FIG. 3) to be set by the CPU core (1) 101 (S508).

When the value of the OS startup enable flag 333 becomes the value to notify that IO access is allowed ("startup instructed" in S508), the CPU core (2) 102 performs the initialization process of the OS (2) 211 involving IO access (S509).

Further, the CPU core (2) 102 starts the scheduler 212 of the OS (2) 211 (S510) and starts the regular operation of the OS (2) 211.

The CPU core (2) 102 also monitors the process transition flag 334 (FIG. 3) (S511). When the value of the process transition flag 334 is enabled, the CPU core (2) reads the context information of the program (A) 204 which has been operating properly on the OS (1) 202 from the OS (1) dedicated area 321 to make the program (A) 204 resume operating on the OS (2) 211 (S512).

Then, the CPU core (2) 102 refers to the CPU wait flag 335 and checks whether or not the CPU core (1) 101 is in the idle state (S513).

If the CPU core (1) 101 is in the idle state (YES in S513), the CPU core (2) 102 places the CPU core (1) 101 under the control of the scheduler 212 (S514) to make the OS (2) 211 operate as the OS for the SMP.

The CPU core (2) 102 also newly secures for the OS (2) 211 and additionally places under the control of the OS (2) 211 the OS (1) execution area 311 which has been used by the OS (1) 201 (S515).

As described above, in the computer system according to this embodiment, it is possible to continue processing using a multi-core processor and also secure the stability of the system.

The above description has presented a procedure for restoring a stable state using the OS (2) 211 when unstable operation occurs in a program on the OS (1) 201.

When unstable operation occurs in a program on the OS (2) 211, a stable state can be restored using the OS (1) 201 in substantially the same manner.

In the above, an example where two CPU cores constitute the multi-core processor 100 has been described.

When three or more CPU cores are used, it is possible to separate some of the CPU cores and restore a stable state in substantially the same matter.

In the above, the computer system with the multi-core processor 100 including a plurality of CPU cores has been described. This embodiment can also be applied to a computer system constituted by a plurality of processors (CPUs).

With the procedure presented in this embodiment, a control method according to the present invention can be realized.

This embodiment has described a high-availability computer scheme that achieves the stabilization of a system by
- separating, at one point, a CPU core which is operating in a multi-core processor;
- making an OS newly operate on the separated CPU core; and
- making the newly operating OS undertake processing in an OS which has been operating.

This embodiment has also described the high-availability computer scheme, wherein the newly operating OS integrates CPU cores used by the OS which has been operating and continues processing.

This embodiment has also described the high-availability computer scheme, wherein a memory used by each OS is changed dynamically.

REFERENCE SIGNS LIST

10: computer system, 100: multi-core processor, 101: CPU core (1), 102: CPU core (2), 110: bus, 111: RAM, 112: ROM, 113: IO device, 200: boot loader, 201: OS (1), 202: scheduler, 203: instability detector, 204: program (A), 205: program (B), 211: OS (2), 212: scheduler, 213: instability detector, 301: boot loader execution image, 302: OS execution image, 303: application image, 304: snapshot image (1), 305: snapshot image (2), 311: OS (1) execution area, 312: OS (2) execution area, 313: shared memory area, 321: OS (1) dedicated area, 322: OS (2) dedicated area, 331: startup flag, 332: preparation complete flag, 333: OS startup enable flag, 334: process transition flag, 335: CPU wait flag, 336: re-activation operation flag

The invention claimed is:

1. A computer system comprising:
a plurality of CPUs (Central Processing Units), wherein
when the plurality of CPUs share execution of an OS (Operating System) and a program operating on the OS,
a specific CPU of the plurality of CPUs withdraws from sharing the execution of the OS and the program, starts a replacement OS which replaces the OS, and switches an OS on which the program operates from the OS to the replacement OS; and
after the OS on which the program operates is switched to the replacement OS, another CPU which is a CPU other than the specific CPU terminates the execution of the OS,
the computer system is connected to a device to be accessed by the OS and the replacement OS;
the specific CPU performs a first initialization process of the replacement OS in which access to the device by the replacement OS does not occur, notifies the another CPU that the first initialization process has been performed, and when it is notified by the another CPU that access to the device by the replacement OS is allowed, performs a second initialization process of the replacement OS in which access to the device by the replacement OS occurs, and thereby starts the replacement OS; and
when it is notified by the specific CPU that the first initialization process has been performed, the another CPU prohibits access to the device by the OS, and notifies the specific CPU that access to the device by the replacement OS is allowed.

2. The computer system according to claim 1, wherein after terminating the execution of the OS, the another CPU shares execution of the replacement OS and a program operating on the replacement OS with the specific CPU.

3. The computer system according to claim 1, wherein when a failure related to the OS is detected while the plurality of CPUs are sharing the execution of the OS and the program operating on the OS, the specific CPU
withdraws from sharing the execution of the OS and the program,
re-activates the specific CPU,
starts the replacement OS, and
switches the OS on which the program operates from the OS to the replacement OS, and
after the OS on which the program operates is switched to the replacement OS, the another CPU terminates the execution of the OS and the another CPU is re-activated.

4. The computer system according to claim 1, further comprising
a shared memory which is shared by the plurality of CPUs, wherein
when the specific CPU has performed the second initialization process, the specific CPU notifies the another CPU that the second initialization process has been performed, and when it is notified by the another CPU that context information of the program has been stored in the shared memory, the specific CPU switches the OS on which the program operates from the OS to the replacement OS, and executes the program on the replacement OS using the context information stored in the shared memory; and
when it is notified by the specific CPU that the second initialization process has been performed, the another CPU stores the context information of the program in the shared memory, and notifies the specific CPU that the context information has been stored in the shared memory.

5. A control method to be performed in a computer system having a plurality of CPUs (Central Processing Units), the control method comprising:
when the plurality of CPUs share execution of an OS (Operating System) and a program operating on the OS,
withdrawing a specific CPU of the plurality of CPU from sharing the execution of the OS and the program, starting a replacement OS which replaces the OS, and switching an OS on which the program operates from the OS to the replacement OS, by a specific CPU of the plurality of CPUs;
terminating the execution of the OS by another CPU which is a CPU other than the specific CPU after the OS on which the program operates is switched to the replacement OS, wherein
the computer system is connected to a device to be accessed by the OS and the replacement OS;
the specific CPU performs a first initialization process of the replacement OS in which access to the device by the replacement OS does not occur, notifies the another CPU that the first initialization process has been performed, and when it is notified by the another CPU that access to the device by the replacement OS is allowed, performs a second initialization process of the replacement OS in which access to the device by the replacement OS occurs, and thereby starts the replacement OS; and when it is notified by the specific CPU that the first initialization process has been performed, the another CPU prohibits access to the device by the OS, and notifies the specific CPU that access to the device by the replacement OS is allowed.

\* \* \* \* \*